(12) United States Patent
Funakoshi

(10) Patent No.: US 6,977,110 B2
(45) Date of Patent: Dec. 20, 2005

(54) FOAMED THERMOPLASTIC RESIN MOLDING FOR AUTOMOTIVE INTERIOR AND PRODUCTION METHOD THEREOF

(75) Inventor: Satoru Funakoshi, Kameoka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 180 days.

(21) Appl. No.: 09/853,160

(22) Filed: May 11, 2001

(65) Prior Publication Data

US 2001/0041245 A1    Nov. 15, 2001

(30) Foreign Application Priority Data

May 15, 2000  (JP) .............................. 2000-141318

(51) Int. Cl.[7] .............................. B32B 3/10; B32B 3/12; B32B 3/00
(52) U.S. Cl. ...................... 428/138; 428/158; 428/159; 428/161; 428/170; 381/389
(58) Field of Search .............................. 428/138, 158, 428/159, 161, 170; 381/87, 389

(56) References Cited

U.S. PATENT DOCUMENTS

| | | | |
|---|---|---|---|
| 4,211,590 A | * | 7/1980 | Steward et al. ............... 156/79 |
| 4,741,945 A | * | 5/1988 | Brant et al. .................. 428/158 |
| 5,252,269 A | | 10/1993 | Hara et al. |
| 5,281,376 A | | 1/1994 | Hara et al. .................. 264/46.4 |
| 5,304,579 A | | 4/1994 | Hara et al. ..................... 521/51 |
| 5,793,002 A | * | 8/1998 | Sato et al. .................. 181/169 |
| 6,300,386 B1 | * | 10/2001 | Karukaya et al. ........... 521/137 |
| 6,342,176 B2 | * | 1/2002 | Goto et al. .................. 264/255 |

FOREIGN PATENT DOCUMENTS

| EP | 0 58410 A2 | 6/1995 |
|---|---|---|
| EP | 0 925895 A1 | 6/1999 |
| JP | 06-344362 | 12/1994 |

* cited by examiner

Primary Examiner—Harold Pyon
Assistant Examiner—Patricia L. Nordmeyer
(74) Attorney, Agent, or Firm—Fitch Even Tabin & Flannery

(57) ABSTRACT

The present invention provides a speaker grille-integrated foamed thermoplastic resin molding for automotive interior comprising a base portion and a speaker grille wherein at least the base portion has a foamed layer and the foamed layer in the base portion has a density $\rho$ of not greater than 0.7 g/cm$^3$ and an average expansion ratio of the speaker grille is 1 to 1.3 times, said molding being lightweight and being strong even in its speaker grille part so that it can be used as a speaker grille-integrated foamed thermoplastic resin molding for automotive interior such as a door trim and an instrument panel.

2 Claims, 5 Drawing Sheets

— 1 —

FOAMED THERMOPLASTIC RESIN MOLDING FOR AUTOMOTIVE INTERIOR AND PRODUCTION METHOD THEREOF

BACKGROUND OF THE INVENTION

1. Field of the Invention

The present invention relates to speaker grille-integrated foamed thermoplastic resin moldings for automotive interior.

2. Description of the Related Art

There has heretofore been a strong demand for the weight reduction of automotive interior parts and the application of foamed moldings are known as a measure for such weight reduction. For example, JP-A-11-179752 discloses automotive interior parts comprising a foamed polyolefin-based resin molding constituted of a skin layer and a foamed layer.

However, there is a problem, with a speaker grille portion constituted of a mesh or lattice form, that if even the thin frame portion forming the speaker grille is formed of a foam having an expansion ratio comparable to or greater than that of the foamed layer in the base portion, the speaker grille portion is easily broken by impact load applied.

SUMMARY OF THE INVENTION

In view of such situation, the inventors of the present invention studied to develop a speaker grille-integrated foamed thermoplastic resin molding for automotive interior excellent in strength even in its speaker grille portion without impairing the original object of the invention, weight reduction, and have reached the present invention.

Accordingly, the present invention provides a speaker grille-integrated foamed thermoplastic resin molding for automotive interior comprising a base portion and a speaker grille wherein at least the base portion has a foamed layer and the foamed layer in the base portion has a density $\rho$ of not greater than $0.7 \text{ g/cm}^3$ and an average expansion ratio of the speaker grille is 1 to 1.3 times, and also provides a method for producing the same.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE PREFERRED EMBODIMENTS

Figure 1:
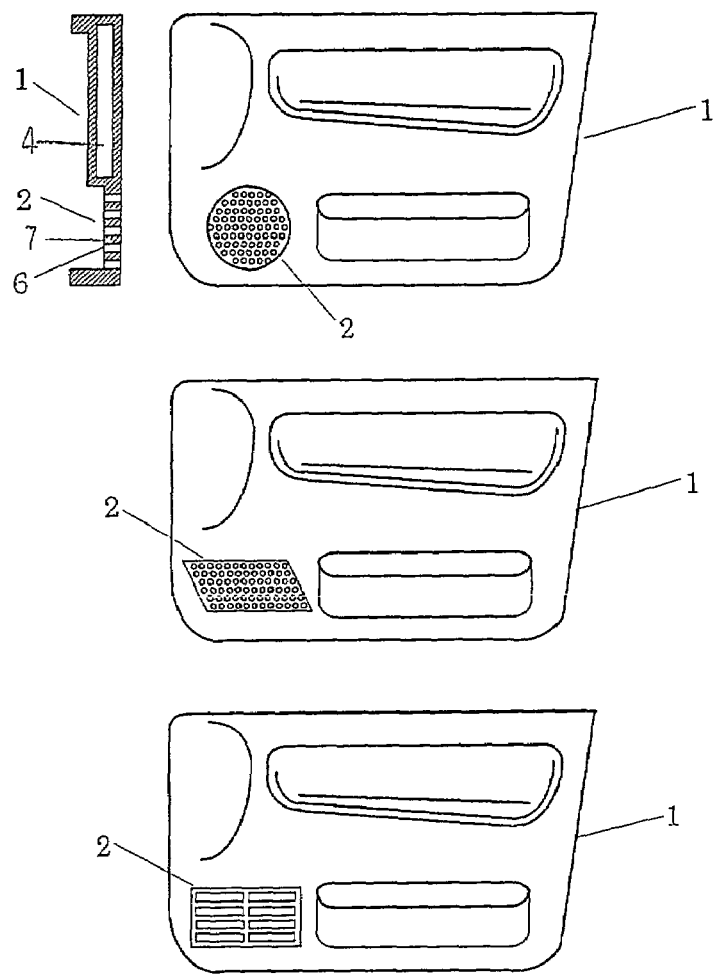
FIG. 1 illustrates an example of the speaker grille-integrated foamed thermoplastic resin molding for automotive interior of the present invention, in a plan and sectional schematic views.

The speaker grille-integrated foamed thermoplastic resin molding for automotive interior of the present invention is constituted of a base portion (1) having a foamed layer (4) as shown in FIG. 1 and a speaker grille (2).

Although the speaker grille which is to be integrated with the base portion may be that which is formed in one piece with the base portion from the same material as the base portion and also may be that which is formed as a separated mold member and thereafter is mounted to the base portion, it is preferably that which is formed in one piece with the base portion from the same material as the base portion.

As such an integrated foamed thermoplastic resin molding for automotive interior constituted of a base portion (1) and a speaker grille (2), various kinds of trims such as door trims and side trims, various kinds of pillars and also instrument panels can be mentioned.

The base portion has, in its almost entire surface, a multilayer structure where a skin layer (3) with no or almost no void is formed in at least a surface that will become a designed surface and a foamed layer having a void is formed inside the skin layer (3).

The skin layer formed in the surface of the base portion may be applied with various types of designed pattern or grain pattern. Moreover, various kinds of skin materials such as sheets or films of thermoplastic resin, woven fabrics, non-woven fabrics and knitted fabrics may be laminated on the front surface or the back surface of the base portion, as needed.

Figure 2:
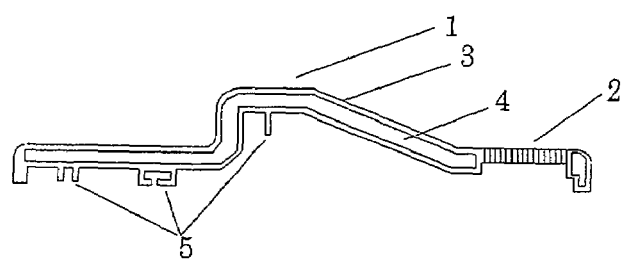
FIG. 2 illustrates an example of the speaker grille-integrated foamed thermoplastic resin molding for automotive interior of the present invention, in a schematic sectional view.

Furthermore, the base portion may optionally be provided with a projection (5) such as rib, boss and bracket on its back surface as shown in FIG. 2.

Although such a projection (5) also may have a foamed layer, it is preferable that the projection is non-foamed or, even if it has a foamed layer inside, the foamed layer is of a very low expansion ratio, since a foamed layer will cause reduction of strength.

In such a base portion, the foamed layer in the base portion is necessary to have a density of not greater than 0.7 $g/cm^3$, and preferably not greater than 0.6 $g/cm^3$ in order to achieve satisfactorily light weight. There is no particular lower limit in density of the foamed layer, but the density of the foamed layer is preferably at least 0.2 $g/cm^3$ in view of reduction of strength of the foamed layer.

Figure 3:
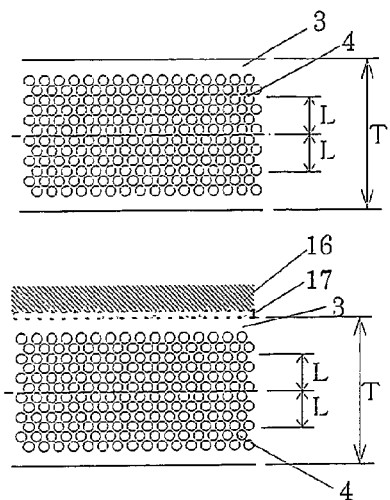
FIG. 3 is a schematic sectional view of the base portion of a speaker grille-integrated foamed thermoplastic resin molding for automotive interior of the present invention.

By "the density of the foamed layer (4) of the base portion (1)" used herein is indicated a density of a layer (2L) obtained by cutting out along the levels each lying away from the almost central level of the foamed molding including the skin layer (3) by 30% (L=0.3 T) of the thickness of the foamed molding wherein the thickness of the foamed molding is represented by T as shown in FIG. 3.

In the measurement of the density, for optional five points in the base portion, the weight of each cut sample with a dimension of 20 mm×20 mm is divided by the volume of the sample to obtain the density, and the average of the densities at the five points is used as the density of the base portion (1).

Moreover, in the case where a skin material (16) is laminated to the surface of the base portion, the thickness of the portion other than the skin material and a skin material joined portion (17) is defined as the thickness (T) of the foamed molding.

The base portion (1) is not required to be flat and may have a curved surface or a concave or convex portion so as to have a desired shape.

If the base portion (1) is too thin, it may be poor in strength. Therefore, it is generally 2 to 10 mm, and preferably about 2.5 to 8 mm in thickness.

It is preferable that the weight of the base portion per unit area is as light as possible, but it is generally not greater than 200 $g/m^2$, and desirably not greater than 1800 $g/m^2$.

The speaker grille (2) integrally formed in the base portion (1) has, as shown in FIG. 1, a structure where a plurality of opening holes (6) are formed in order to transmit the sound from a speaker installed behind the speaker grille.

An opening ratio of the speaker grille is not less than 30%, and desirably not less than 40% in order that a satisfactory sound transmittance is achieved. A lattice-like frame (7) of thermoplastic resin is formed among the opening holes.

In the present invention, the boundary of the base portion (1) and the speaker grille (2) is defined with respect to the opening holes (6) arranged in the outermost area of the speaker portion and the speaker grille is the region surrounded by lines linearly connecting the outermost opening holes. In such an area, there are many opening holes and many continuous lattice-like thermoplastic resin members (7) for defining the opening holes.

By the average expansion ratio of the speaker grille (2) is meant an average expansion ratio of the thermoplastic resin member (7) of lattice-like shape formed in that region. In the present invention, the entire thermoplastic resin member (7) formed in a lattice form is required to be non-foamed or to have an average expansion ratio of not greater than 1.3 times.

Here, the expansion ratio of the speaker grille may be represented by a ratio of the specific gravity of the thermoplastic resin member (7) in the non-foamed portion of the speaker grille to that of the thermoplastic resin member in the entire speaker grille.

When there is no clear non-foamed portion in the thermoplastic resin member of the speaker grille, the specific gravity of a non-foamed plate prepared by the following procedure may be used as a specific gravity of the non-foamed portion in the above definition; a part of the speaker grille is once melted at a temperature suitable for that material and then formed into a non-foamed plate by using a cooling press or the like. The pressure applied is in a range of 0.1 to 5 MPa.

Measurement of specific gravity may use known techniques such as general immersion method.

The shape of the opening hole (6) to be formed into the speaker grille (2) may be round, oval, rectangle, parallelogram, etc. or their combinations and the number thereof may also be optionally determined depending on a desired opening ratio. The opening holes (6) are arranged so as to form a desired formation, such as round, rectangle and parallelogram, according to the design of the desired products.

The size of the opening hole (6) is also optionally determined according to a necessary opening ratio, the size of the speaker grille or the like. In the case of a round opening hole, its diameter is usually about 1.5 mm to 5 mm. In the case of a rectangular opening hole, a long opening hole is formed so that its short side may become about 1.5 to 3 mm long.

Although the width of the lattice-like thermoplastic resin member (7) which is to become a frame formed among the opening holes is also optionally determined depending on the shape of desired opening holes and a desired opening ratio, there is a tendency that if one wants to achieve a higher opening ratio, the frame may become thinner. For example, in the case of a speaker grille (2) formed from a plurality of round opening holes, the width of the frame formed is in a range of about 0.5 mm to 3 mm at its thinnest site. In the case of rectangular opening holes, it is in a range of about 1 mm to 5 mm.

The thickness of the speaker grille is in a range of about 1.5 mm to 5 mm, and desirably about 2 to 4 mm since too thick speaker grilles prevent sound transmission or weight reduction.

On the back surface of the speaker grille may be formed a projection such as a rib, a boss and a joint to other parts. In such instances, as an average expansion ratio, a value of the speaker grille including such a projection is used.

Moreover, mesh wire, woven fabric, knitted fabric or the like may be applied on the front surface or the back surface of the speaker grille.

Examples of the thermoplastic resin to be used for such foamed moldings include thermoplastic resins such as polypropylene, polyethylene, polyethylene terephthalate (PET), acrylonitrile-styrene copolymer (AS resin), acrylonitrile-butadiene-styrene terpolymer (ABS resin), polystyrene (PS resin), polycarbonate resin (PC resin) and polyamide; or polymer alloys composed of those thermoplastic resins. These materials are used alone or in combination.

Such a resin may contain fillers such as talc, fillers for reinforcement such as glass fibers, pigments for coloring, various colorants for nonuniform patterns, polyester fibers and the like. Moreover, it may also contain various additives such as antistatic agents, weathering agents, lubricants and the like.

Among these thermoplastic resins, unmixed polypropylene-based resin or mixtures of polypropylene-based resin and other thermoplastic resins or elastomers are preferably used because of their excellent formability or light weight. Here, the polypropylene-based resin may be either polypropylene homopolymer or copolymers obtained by polymerizing propylene, which is a main component, and other olefin components such as ethylene.

When using polypropylene-based resin as a mixture, it is preferable to set the content of the polypropylene-based resin in the resin components other than various additives (when an elastomer is incorporated, the elastomer is considered as a resin component) to be 70% by weight or more so as not to impair the characteristics of the polypropylene-based resin.

Mixtures containing elastomers incorporated for the purpose of imparting flexibility to polypropylene-based resins are more desirably used.

The elastomers used for such purpose may be exemplified by natural rubber, olefin-based rubbers such as isoprene rubber, styrene-butadiene rubber, butadiene rubber, nitrile rubber, ethylene-propylene rubber, ethylene-butene rubber and ethylene-octene rubber, and fluororubber. Among them, olefin-based rubbers having DSC peak values of about 40 to 100° C. (temperature elevation rate: 10° C./min), Shore A hardness of 70 to 90 (JIS K 6301, 23° C.) and tensile elongation of 600% (JIS K 6301, 23° C.) are desirable because of their excellent heat resistance.

When these elastomers are mixed, the amount thereof may be selected depending upon the type of a thermoplastic resin to be used, properties required for a desired molding and the like. When an olefin-based rubber is added to a polypropylene-based resin, the weight ratio of the polypropylene-based resin to the olefin-based rubber is approximately 7:3 to 9:1.

The method for producing the speaker grille-integrated foamed thermoplastic resin molding for automotive interior of the present invention is not particularly limited, but preferably applied are methods comprising supplying and charging a molten thermoplastic resin containing a foaming component into a mold cavity formed in a mold comprising a pair of a female and male mold members and enlarging the mold cavity of the mold, thereby foaming the molten thermoplastic resin to produce a foamed thermoplastic resin molding.

In such methods, a mold may be used that has a structure where a cavity can be freely enlarged and reduced using a slide core or the like in a speaker grille portion or a region including the speaker grille portion and its periphery portion.

Examples of such methods include a method for producing a speaker grille-integrated foamed thermoplastic resin molding for automotive interior, the process using a mold, which can be opened and closed, comprising a pair of a female and male mold members, the mold having an opening hole-forming pin for forming an opening hole of the speaker grille and a slide core that can be moved forward and backward in the mold opening-and-closing direction, the mold having a structure capable of causing the female and male mold members to form a partial contact state by means of the opening hole-forming pin and the slide core and capable of freely controlling a mold cavity clearance defined by the female and male mold members while causing the slide core to move so as to maintain the contact state, wherein the process comprises the steps of:

(a) charging a molten thermoplastic resin containing a foaming component into a mold cavity defined by the female and male mold members while causing the female and male mold members to form the partial contact state by means of the opening hole-forming pin and the slide core;

(b) forming a solidified layer in a surface of the molten thermoplastic resin charged in the mold cavity;

(c) opening, after the formation of the solidified layer, the mold in the molding thickness direction so that the mold cavity clearance becomes the thickness of a final molding while moving the slide core so as to maintain the contact state, thereby foaming an unsolidified portion of the molten thermoplastic resin charged; and (d) cooling a molding while maintaining the mold cavity clearance at the thickness of the final molding.

This method includes, for example, the following variations:

(1) A method using a mold comprising a female and male mold members wherein the parting surface of the female and male mold members, which is formed in the contact state partially formed by the female and male mold members by means of the opening hole-forming pin and the slide core, is defied by the tip of an opening hole-forming pin installed in one mold member and a slide core installed in another mold member;

(1') A method using a mold comprising a female and male mold members wherein the parting surface of the female and male mold members, which is formed in the contact state partially formed by the female and male mold members by means of the opening hole-forming pin and the slide core, is defied by the tip of an opening hole-forming pin installed in the slide core installed in one mold member and a slide core installed in another mold member;

(2) A method using a mold comprising a female and male mold members wherein the parting surface of the female and male mold members, which is formed in the contact state partially formed by the female and male mold members by means of the opening hole-forming pin and the slide core, is defied by the tip of an opening hole-forming pin installed in the slide core installed in one mold member and the mold cavity surface of another mold member; and (3) A method using a mold comprising a female and male mold members wherein the parting surface of the female and male mold members, which is formed in the contact state partially formed by the female and male mold members by means of the opening hole-forming pin and the slide core, is defied by the tip of an opening hole-forming pin installed in one mold member and the tip of an opening hole-forming pin installed in the slide core installed in another mold member.

(3') A method using a mold comprising a female and male mold members wherein the parting surface of the female and male mold members, which is formed in the contact state partially formed by the female and male mold members by means of the opening hole-forming pin and the slide core, is defied by the tip of an opening hole-forming pin installed in the slide core installed in one mold member and the tip of an opening hole-forming pin installed in the slide core installed in another mold member.

More specific embodiments will be described below.

In the aforementioned method (1), a method can be mentioned, the method using a mold, which can be opened and closed, comprising a female and male mold members wherein one mold member or a slide core installed in one mold member has an opening hole-forming pin for forming an opening hole of a speaker grille and another mold member has a slide core that can be moved forward and backward in the mold opening-and-closing direction so that the tip of the opening hole-forming pin comes in contact with the slide core installed in the another mold member, the method comprising the steps of:

(a) charging a molten thermoplastic resin containing a foaming component into a mold cavity while keeping the tip of the opening hole-forming pin and the slide core in contact;

(b) forming a solidified layer in a surface of the molten thermoplastic resin charged in the mold cavity;

(c) opening, after the formation of the solidified layer, the mold in the molding thickness direction so that the mold cavity clearance becomes the thickness of a final molding while moving the slide core installed in the one mold member and/or the slide core installed in the another mold member so that the tip of the opening hole-forming pin and the slide core installed in the another mold member maintain the contact state, thereby foaming an unsolidified portion of the molten thermoplastic resin charged; and (d) cooling a molding while maintaining the mold cavity clearance at the thickness of the final molding.

In the aforementioned method (2), a method can be mentioned, the method using a mold, which can be opened and closed, comprising a female and male mold members wherein one mold member has a slide core equipped with an opening hole-forming pin for forming an opening hole of a speaker grille wherein the slide core can be moved forward and backward in the mold opening-and-closing direction so that the tip of the opening hole-forming pin comes in contact with the mold cavity surface of another mold member, the method comprising the steps of:

(a) charging a molten thermoplastic resin containing a foaming component into a mold cavity while keeping the tip of the opening hole-forming pin and the mold cavity surface in contact;

(b) forming a solidified layer in a surface of the molten thermoplastic resin charged in the mold cavity;

(c) opening, after the formation of the solidified layer, the mold in the molding thickness direction so that the mold cavity clearance becomes the thickness of a final molding while moving the slide core so that the tip of the opening hole-forming pin and the mold cavity surface maintain the contact state, thereby foaming an unsolidified portion of the molten thermoplastic resin charged; and (d) cooling a molding while maintaining the mold cavity clearance at the thickness of the final molding.

In the aforementioned method (3), a method can be mentioned, the method using a mold, which can be opened and closed, comprising a female and male mold members wherein one mold member (a first mold member) or a slide core installed in one mold member (a first mold member) has an opening hole-forming pin for forming an opening hole of a speaker grille and another mold member (a second mold member) has a slide core equipped with an opening hole-forming pin for forming an opening hole of the speaker grille and the slide core installed in the second mold member can be moved forward and backward in the mold opening-and-closing direction so that the tip of the opening hole-forming pin of the first mold member comes in contact with the tip of the opening hole-forming pin of the second mold member, the method comprising the steps of:

(a) charging a molten thermoplastic resin containing a foaming component into a mold cavity while keeping the tip of the opening hole-forming pin of the first mold member and the tip of the opening hole-forming pin of the second mold member in contact;

(b) forming a solidified layer in a surface of the molten thermoplastic resin charged in the mold cavity;

(c) opening, after the formation of the solidified layer, the mold in the molding thickness direction so that the mold cavity clearance becomes the thickness of a final molding while moving the slide core installed in the first mold member and/or the slide core installed in the second mold member so that the tip of the opening hole-forming pin of the first mold member and the tip of the opening hole-forming pin of the second mold member maintain the contact state, thereby foaming an unsolidified portion of the molten thermoplastic resin charged; and (d) cooling a molding while maintaining the mold cavity clearance at the thickness of the final molding.

As the foaming component to be incorporated in the thermoplastic resin, conventionally known chemical foaming agents may be applied or gas such as carbon dioxide and nitrogen may be charged directly into a molten resin under pressure.

When a chemical foaming agent is used, the kind thereof is not particularly limited, but inorganic foaming agents mainly containing sodium bicarbonate or the like are preferably employed since they are less corrosive to the mold.

Such a chemical foaming agent may be added and incorporated during melt kneading with the thermoplastic resin, but it is generally used as a master batch prepared by kneading it into a thermoplastic resin so that its content would become 20 to 80% by weight.

The following is a description on a typical method.

Figure 4:
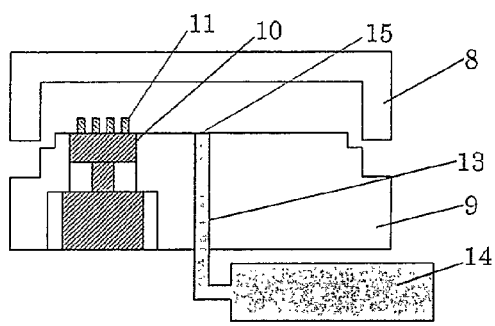
FIG. 4 illustrates an example of a mold for producing a speaker grille-integrated foamed thermoplastic resin molding for automotive interior of the present invention, in a schematic sectional view.

FIG. 4 is a schematic sectional view illustrating an example of a mold used in a method of the present invention. This mold comprises a pair of a female mold member (8) and a male mold member (9). In general, one of the mold members is associated with a press device and another one is fixed, whereby the mold members can be opened and closed vertically or horizontally.

In the drawing, the male mold member (9) is fixed, the female mold member (8) is connected with a press unit (mot shown), and the mold members can be opened and closed vertically.

In a predetermined position in the mold, which can be opened and closed, comprising a pair of the female and male mold members, an opening hole-forming pin (11) for forming an opening hole of a speaker grille and a slide core (10) are installed. Although, in the drawing, a slide core (10) equipped with an opening hole-forming pin (11) for forming an opening hole is installed in the male mold member (9), the slide core (10) may be installed in the female mold member (8). Moreover, an opening hole-forming pin (11) and a slide core (19) may be installed in different mold members. Another possible embodiment is that an opening hole-forming pin (11) is installed in one mold member and a slide core (10) equipped with another opening hole-forming pin (11) is installed in another mold member so that the tips of the two opposing opening hole-forming pins come in contact with each other. Still another possible embodiment is that an opening hole-forming pin movable forward and backward in the mold opening direction is installed in one mold member and a slide core (10) is installed in another mold member. Alternatively, an opening hole-forming pin (11) movable forward and backward may be installed in a slide core (10). Furthermore, slide cores (10) each equipped with an opening hole-forming pin (11) may be installed in both mold members.

The slide core (10) may be moved with optional known means such as a cylinder utilizing oil pressure, air pressure or the like and may also be moved with a spring or the like.

A method for supplying a molten thermoplastic resin (12) to a mold cavity is optional, but a method is usually employed by choice in which a resin supply opening (15), which is connected to a resin supply device (14) via a resin supply passage (13) dug in the mold, is provided in the molding surface of one or both of the female and male mold members, and the molten thermoplastic resin (12) is supplied to the cavity through the resin supply opening.

In this case, it is preferable that a freely-operatable valve is installed in the resin supply passage (13) in the vicinity of the resin supply opening (15) and the supply of a molten thermoplastic resin accumulated in the resin supply device (14) such as an injection unit and the stop thereof can freely be controlled.

Charging of the molten thermoplastic resin (12) into the mold cavity may be effected by a method using injection charge in the state where both mold members are closed. The molten thermoplastic resin may also be charged by the clamping operation of the mold members after the supply of the molten resin to between the opened mold members. The charging method may be selected according to the desired product form.

In any method, the temperature of the molten thermoplastic resin to be supplied may be determined according to the type of the resin to be used. For example, when using a thermoplastic resin material comprising a polypropylene-based resin and an olefin-based rubber added thereto, the resin temperature is about 170 to 260° C., and preferably about 190 to 230° C.

Figure 5:
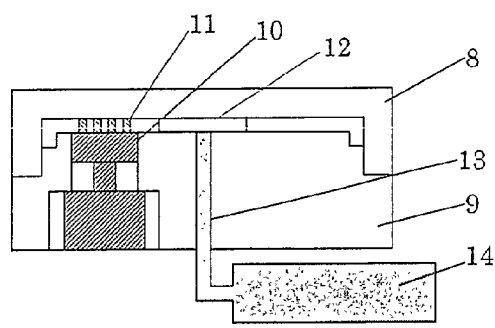
FIG. 5 illustrates the manufacture process of the speaker grille-integrated foamed thermoplastic resin molding for automotive interior of the present invention using a schematic sectional view of a mold.
Figure 6:
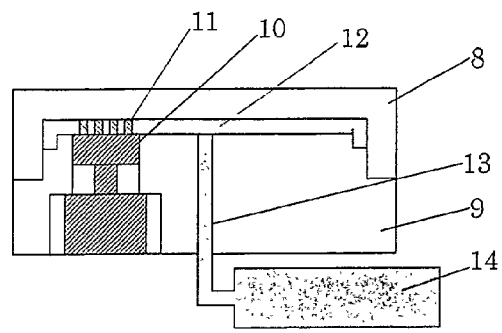
FIG. 6 illustrates the manufacture process of the speaker grille-integrated foamed thermoplastic resin molding for automotive interior of the present invention using a schematic sectional view of a mold.
Figure 7:
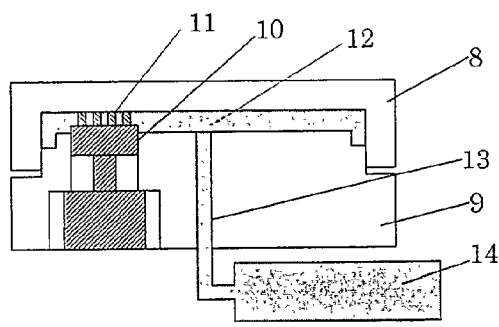
FIG. 7 illustrates the manufacture process of the speaker grille-integrated foamed thermoplastic resin molding for automotive interior of the present invention using a schematic sectional view of a mold.

The former method in which a molten thermoplastic resin is charged into a mold cavity by injection charging can be exemplified by a method in which the supply of a molten thermoplastic resin is commenced with both mold members positioned so that the cavity clearance is less than the thickness of a molding before foaming (FIG. 5), the mold is opened concurrently with the supply of the molten thermoplastic resin (FIG. 6), whereby the molten thermoplastic resin is charged in the cavity so that the cavity clearance becomes, at the same time when the supply of the molten thermoplastic resin is completed, equal to the thickness of the molding before foaming (FIG. 7), and a method in which the molten thermoplastic resin is supplied with both mold members positioned so that a cavity clearance equal to the thickness of the molding before foaming is defined, whereby the molten thermoplastic resin is supplied and charged in the cavity.

In the former case where the supply of the molten thermoplastic resin (12) is commenced with the mold members positioned so that the cavity clearance is less than the thickness of the molding before foaming, the cavity clearance defined at the time of the supply commencement ranges, in terms of a cavity volume, usually no less than 5% by volume and less than 100% by volume, preferably no less than 30% by volume and no greater than 70% by volume, based on the volume of a predetermined quantity of molten thermoplastic resin before foaming.

If the supply of the molten thermoplastic resin (12) is commenced in such a state, the movable mold member retreats so that the cavity clearance is enlarged with the proceeding of the supply of the molten thermoplastic resin. On the completion of supplying the molten thermoplastic resin of a predetermined quantity, the volume of the molten thermoplastic resin supplied becomes approximately equal to the capacity of the cavity and the molten thermoplastic resin is charged in the cavity.

In such a step, the enlargement of the cavity clearance may be effected actively while controlling the speed of retreating the mold member by use of a press unit or the like associated with the mold. The cavity clearance may also be enlarged by utilizing the supply pressure of the molten thermoplastic resin to be supplied. In any case, it is preferable that the mold cavity enlargement is controlled so that the pressure applied to the resin would become about 2 to 50 MPa.

In the enlargement process of the cavity clearance, the cavity volume may exceed the volume of the molten thermoplastic resin supplied (12). However, if the mold clamping is conducted again before or almost concurrently with the completion of supplying the molten resin, no special problem arises. In such a case, it is also desirable that the pressure applied to the resin does not fall outside the aforementioned range.

Moreover, in the case where a molten thermoplastic resin (10) is supplied with both mold members positioned so that the cavity clearance is equal to the thickness of a molding before foaming, it is only required that the cavity clearance is maintained at the thickness of the molding before foaming from the beginning to the completion of the supply of the molten thermoplastic resin, as in the ordinary injection molding.

Figure 10:
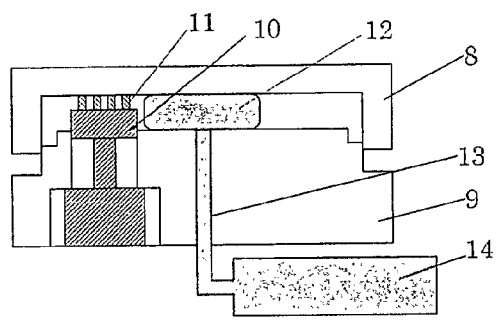
FIG. 10 illustrates the manufacture process of the speaker grille-integrated foamed thermoplastic resin molding for automotive interior of the present invention using a schematic sectional view of a mold.
Figure 11:
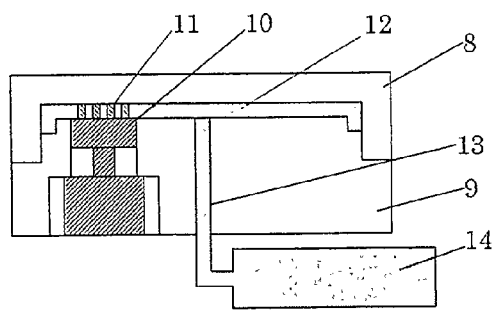
FIG. 11 illustrates the manufacture process of the speaker grille-integrated foamed thermoplastic resin molding for automotive interior of the present invention using a schematic sectional view of a mold.

As a method in which the molten thermoplastic resin is charged in the cavity by the clamping of the mold members, there is a method in which a predetermined quantity of molten thermoplastic resin is supplied with both mold members opened so that the cavity clearance is not smaller than the thickness of the molding before foaming (FIG. 10) and the mold members are closed, after or concurrently with the completion of supplying the molten thermoplastic resin in that state, so that the cavity clearance would coincide with the thickness of the molding before foaming, whereby the molten resin is charged (FIG. 11). Further, there is also another method which comprises commencing the supply of the molten thermoplastic resin with the mold opened so that the cavity clearance would be equal to or greater than the thickness of the molding before foaming, commencing the mold clamping while supplying the molten thermoplastic resin and conducting the supply of the molten resin and the mold clamping in parallel, thereby making the cavity clearance equal to the thickness of the molding before foaming almost concurrently with or after the completion of supplying the molten thermoplastic resin.

During the supply and charge of a molten thermoplastic resin into a mold cavity conducted by such methods, it is necessary that the tip of an opening hole-forming pin (11) installed in one mold member and a slide core (10) installed in another mold member, or the tip of an opening hole-forming pin (11) installed in a slide core (10) installed in one mold member and the mold cavity surface of another mold member, or the tip of an opening hole-forming pin (11) installed in one mold member and the tip of another opening hole-forming pin (11) installed in a slide core (10) installed in another mold member are kept in contact. If there is a gap between the closely facing two mold members, a molten thermoplastic resin will enter the gap, and as a result, no opening hole is formed.

The mold cavity charged with the molten thermoplastic resin (12) is in a state where almost no void is present.

In this state, a skin layer (3) is caused to form in the surface of the molten thermoplastic resin being in contact with the molding surface of the mold. Generally, the temperature of the mold is set to be lower than the melting point or softening point of the molten resin to be used. Therefore, when cooling is conducted with this state maintained, the molten thermoplastic resin supplied begins to solidify from its surface portion being in contact with the molding surface of the mold, and then a skin layer (3) having approximately no voids will be formed soon. Although the temperature of the mold may be optionally determined depending on the type of the resin to be used, it is about 40° C. to 80° C., and preferable about 50° C. to 70° C. when a resin material obtained by adding an olefin-based elastomer to a polypropylene-based resin is used.

The cooling time, that is, the time interval between the completion of the charging of the molten thermoplastic resin into the cavity and the opening of the mold in the next step, has a great effect on the formation of a skin layer. The skin layer (3) becomes thicker with the increase of the cooling time.

However, if the skin layer (3) is too thick, the foaming in the next step does not occur satisfactorily and it is difficult to obtain such moldings that their foamed layers in the base portions have densities not greater than those desired. On the other hand, if the skin layer is too thin, the external appearance of products are deteriorated and the reduction in strength easily occurs. Therefore, cooling is effected so that a skin layer with a desired thickness is formed.

Accordingly, the cooling time is usually about 0.1 to 20 seconds though it may vary depending on various conditions such as the mold temperature, the temperature of the molten thermoplastic resin and the type of the resin.

Figure 8:
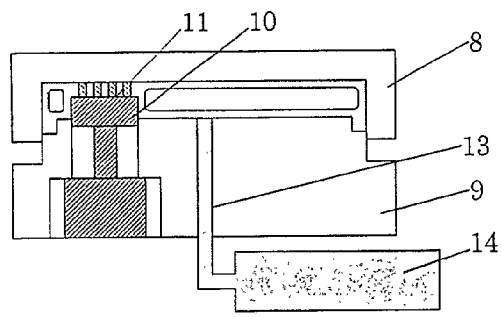
FIG. 8 illustrates the manufacture process of the speaker grille-integrated foamed thermoplastic resin molding for automotive interior of the present invention using a schematic sectional view of a mold.

When the mold cavity is opened in the molding thickness direction after the formation of a predetermined skin layer, the foaming agent confined in the unsolidified portion of the molten thermoplastic resin supplied expands, increasing, as a whole, its thickness in the mold opening direction, that is, in its thickness direction while forming a foamed layer (FIG. 8).

In this situation, by keeping the tip of an opening hole-forming pin (11) installed in one mold member and a slide core (10) installed in another mold member, or the tip of an opening hole-forming pin (11) installed in a slide core (10) installed in one mold member and the mold cavity surface of another mold member, or the tip of an opening hole-forming pin (11) installed in one mold member and the tip of another opening hole-forming pin (11) installed in a slide core (10) installed another mold member, in contact so that they do not separate, the lattice-like thermoplastic resin (7) located among the opening holes is not affected very much by the mold opening and a speaker grille portion with no foamed layer can be formed by the movement of the slide core (10) synchronized with the opening of the mold.

At this time, for forming a foamed layer with a desired expansion ratio in the speaker grille portion, a mold is used which has a structure where an opening hole-forming pin (11) can individually be moved forward and backward. The expansion ratio can be controlled so as to be not greater than 1.3 times by keeping the tip of an opening hole-forming pin (11) installed in one mold member in contact with the mold cavity surface of another mold member, or with a slide core (10), or with the tip of an opening hole-forming pin (11) installed in a slide core (10) and concurrently causing the opening hole-forming pin and the slide core (10) to slide with the opening of the mold cavity, and controlling each sliding stroke so that the moving distance of the opening hole-forming pin (11) is shorter than the opening distance of the mold.

At the time when the cavity clearance has become the thickness of the final molding, the action of opening the mold is stopped and then the molding is cooled while maintaining the cavity clearance at this thickness.

At this time, it is possible to open the mold so that the cavity clearance may exceed the thickness of the final molding and subsequently close it until the cavity clearance becomes equal to the thickness of the final molding while a part of the foamed layer in the thermoplastic resin is still in a molten state.

In this case, it is possible to cause the surface of the foamed molding and the molding surface of the mold to more closely come into contact and also possible to both reproduce the shape of the mold faithfully and improve the cooling efficiency. The mold clamping action may be controlled mechanically. When the mold members are vertically opened, the cavity may be reduced utilizing the weight of the upper mold member.

Furthermore, the surface of the molding and the molding surface of the mold can be brought into contact still more closely by using a mold that has an evacuation opening in at least its mold cavity surface which will be a designed side, and evacuating with an evacuation device connected to the evacuation opening before or after the completion of supplying the molten resin, thereby adsorbing the skin layer formed onto the cavity surface. This may result in both the more faithful reproduction of the mold shape and the greater improvement of cooling efficiency.

Figure 9:
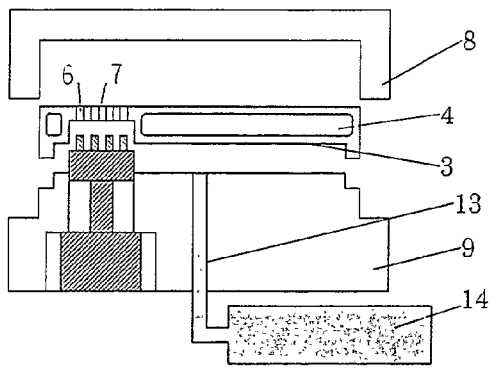
FIG. 9 illustrates the manufacture process of the speaker grille-integrated foamed thermoplastic resin molding for automotive interior of the present invention using a schematic sectional view of a mold.

After the completion of cooling, opening the mold completely and removing a molding from the mold opened (FIG. 9) may result in a foamed thermoplastic resin molding in which a base portion and a speaker grille are formed integrally, the base portion having a dense skin layer (3) in its surface and a foamed layer (4) inside the skin layer (3) and the speaker grille being not foamed or foamed with an expansion ratio of 1.3 times or less.

Figure 12:
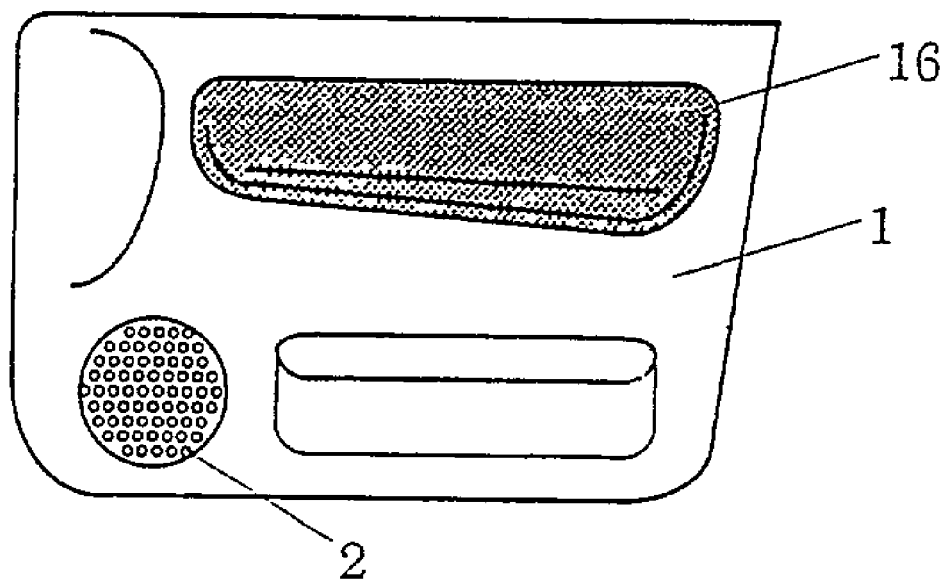
FIG. 12 illustrates an example of the speaker grille-integrated foamed thermoplastic resin molding with a skin material partially laminated for automotive interior of the present invention, in a schematic plan view.

Moreover, by supplying in advance a skin material (16) such as a sheet and a film to a desired position in the mold and then conducting molding in the manner as described above, a skin material-laminated foamed thermoplastic resin molding can be produced wherein a skin material, such as a sheet and a film, is laminated on a part or the entire of the surface of the molding as shown in FIG. 12.

The speaker grille-integrated foamed thermoplastic resin molding for automotive interior is lightweight and is strong even in its speaker grille part. Accordingly, it can be used as a speaker grille-integrated foamed thermoplastic resin molding for automotive interior such as a door trim and an instrument panel.

What is claimed is:

1. A speaker grille-integrated foamed thermoplastic resin molding for automotive interior comprising a base portion and a speaker grille having a plurality of opening holes wherein at least the base portion has a foamed layer and the foamed layer of the base portion has a density $\rho$ of not greater than 0.6 g/cm$^3$ in the base portion and the speaker grille has an average expansion ratio of 1 to 1.3 times, wherein the speaker grille is formed in one piece with the base portion from the same material as the base portion so as to be surrounded by the base portion.

2. The speaker-grille-integrated foamed thermoplastic resin molding for automotive interior according to claim 1, wherein the thermoplastic resin is a thermoplastic resin containing at least about 70% by weight of polypropylene-based resin.

* * * * *